United States Patent

Mai

[11] Patent Number: 6,145,250
[45] Date of Patent: Nov. 14, 2000

[54] FLOWERPOT

[76] Inventor: Chuan-Liang Mai, No. 175, Shuang-Cheng Rd., Hsintien City, Taipei Hsien, Taiwan

[21] Appl. No.: 09/305,795

[22] Filed: Apr. 30, 1999

[51] Int. Cl.[7] .................................................. A01G 27/00
[52] U.S. Cl. ................................................ 47/79; 47/48.5
[58] Field of Search ............................... 47/79, 80, 48.5; 43/57

[56] References Cited

U.S. PATENT DOCUMENTS

| | | | |
|---|---|---|---|
| 918,563 | 4/1909 | Lewis | 47/79 |
| 2,150,605 | 3/1939 | Lester | 47/79 |
| 2,228,892 | 1/1941 | Zimmerman | 47/79 |
| 2,278,991 | 4/1942 | Hasslacher et al. | 47/79 |
| 3,738,060 | 6/1973 | Jullien-Davin . | |
| 4,014,506 | 3/1977 | Hanson . | |
| 4,175,354 | 11/1979 | Anderson | 47/79 X |
| 4,787,169 | 11/1988 | Maxfield et al. | 43/57 |
| 5,062,239 | 11/1991 | Helton | 47/79 |
| 5,491,928 | 2/1996 | Potochnik | 47/79 |
| 5,502,924 | 4/1996 | Lee | 47/79 |
| 5,596,839 | 1/1997 | Ellis-El | 47/79 |

FOREIGN PATENT DOCUMENTS

| | | |
|---|---|---|
| 2410201 | 7/1979 | France . |
| 2532986 | 11/1976 | Germany . |
| 2655656 | 6/1977 | Germany . |
| 4133771 | 4/1992 | Germany . |
| 406054629 | 3/1994 | Japan . |
| 07308133 | 11/1995 | Japan . |
| 408140507 | 6/1996 | Japan . |
| 08172945 | 7/1996 | Japan . |
| 09205909 | 8/1997 | Japan . |
| 10150869 | 6/1998 | Japan . |
| 10327673 | 12/1998 | Japan . |
| 2241860 | 9/1991 | United Kingdom . |

*Primary Examiner*—Michael J. Carone
*Assistant Examiner*—Jeffrey L. Gellner
*Attorney, Agent, or Firm*—Thorp Reed & Armstrong

[57] ABSTRACT

A flowerpot comprises a first pot for excess water, a second pot provided on top of the first pot to hold soil and a plant therein and having a screen on the bottom thereof and a pump having an inlet extending into the first pot from the second pot and an outlet communicating with the inlet. The pump is to pump the water in the first pot to the second pot via the inlet and the outlet, such that the water is able to be recycled by means of the screen. Furthermore, insects depend mainly on water to breed no longer have access to the water in the first pot due to the isolation by the second pot.

1 Claim, 4 Drawing Sheets

FLOWERPOT

BACKGROUND OF THE INVENTION

1. Field of the Invention

The present invention relates to a flowerpot capable of denying a habitat to s insects therein and having a manual pump located therein to facilitate watering the plant by recycling the water in the flowerpot.

2. Description of Related Art

Normally, a vessel is placed under a flowerpot to catch the water that seeps through, thereby allowing the soil in the flowerpot to wick the standing water as the plant needs water. However, insects will take advantage of the standing water in the vessel to breed. A bed for contagious disease is thus formed in the vessel.

To overcome the problem, the invention aims to provide an improved flowerpot to mitigate and/or obviate the aforementioned problems.

SUMMARY OF THE INVENTION

The main object of the present invention is to provide a flowerpot having a double bottom to collect excess water. A first pot for water is placed on the ground and a second pot for soil and the plant is placed on or in the top of the first pot. Because the first pot is closed by the second pot, insects will no longer have access to any excess standing water.

Another advantage of the invention is to provide a pump in the second pot. The pump has an inlet extending into the water in the first pot and an outlet in communication with the inlet, such that excess water is able to be recycled over and over again to water the plant in the flowerpot.

The detailed features of the present invention will be apparent in the detailed description with appropriate reference to the accompanying drawings.

DETAILED DESCRIPTION OF PREFERRED EMBODIMENT

Figure 1:
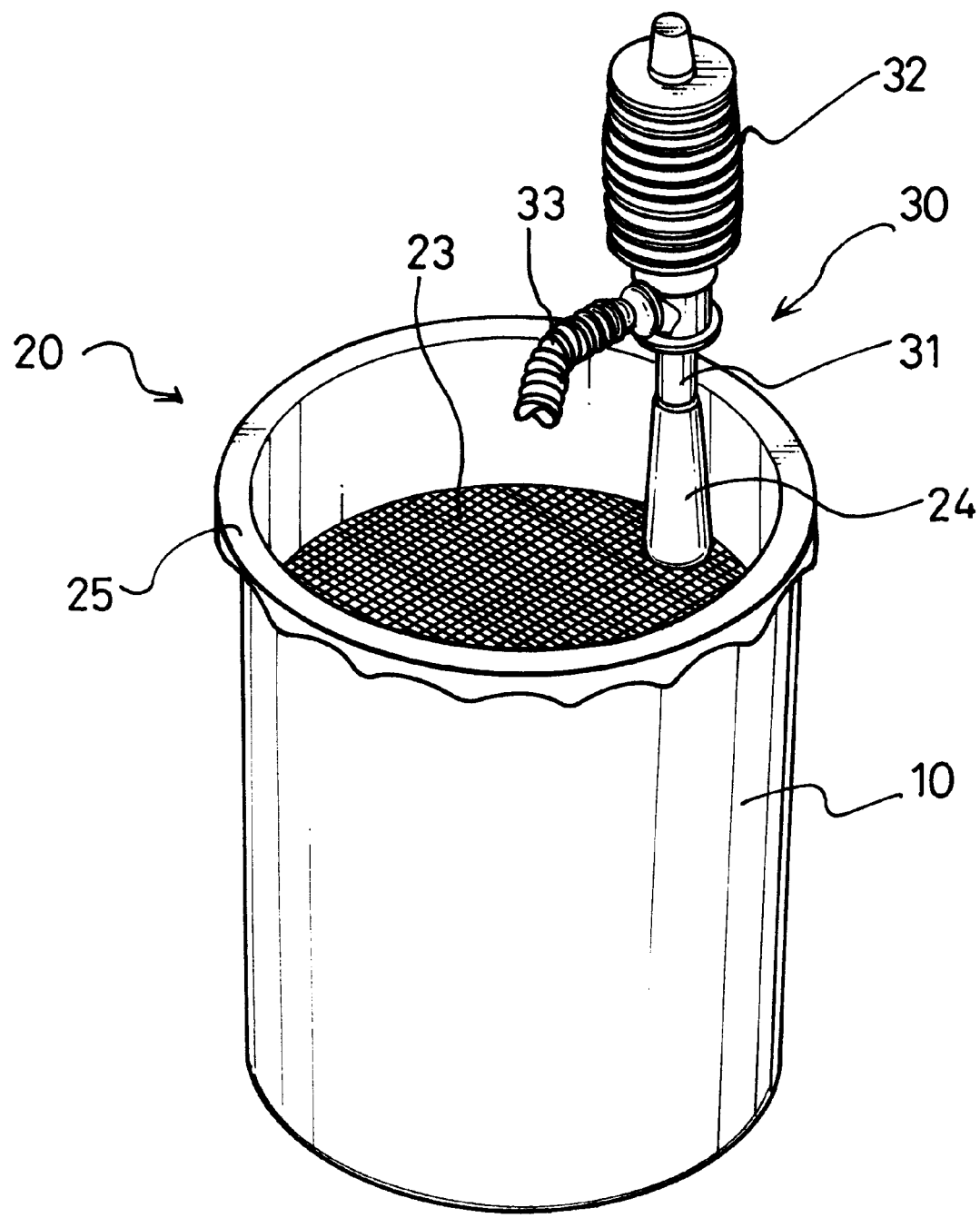
FIG. 1 is a perspective view of a flowerpot in accordance with the present invention.
Figure 2:
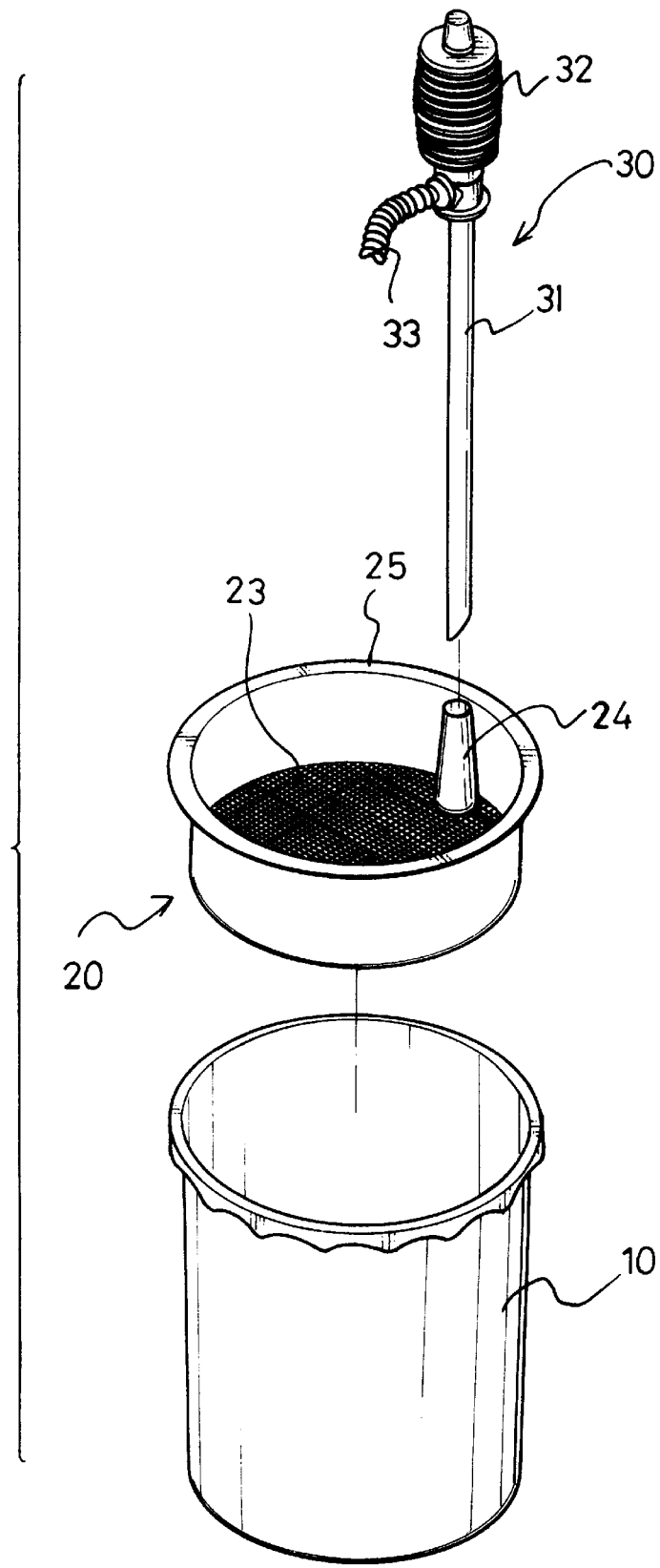
FIG. 2 is an exploded perspective view of the flowerpot shown in FIG. 1.

As shown in FIGS. 1 and 2, a flowerpot in accordance with the present invention comprises a firstfirst pot (10) for water, a second pot (20) for soil and the plant and a pump (30).

The second pot (20) is detachably mounted on top of the first pot (10) and has a flange (25) formed on the upper rim thereof, a screen (23) provided on the bottom thereof and a duct (24) extending through the screen (23).

The first pot (10) has a closed end and an open end (neither numbered) so as that the first pot (10) is able to receive the second pot (20) therein. However, the second pot (20) is supported on top of the first pot (10) by the flange (25), such that the duct (24) extends into the first pot (10). After the first pot (10) and the second pot (20) are assembled, the pump (30) having an inlet (31) connected with the duct (24), a bellows (32) connected with the inlet (31) and an outlet in communication with the inlet (31) is placed in the second pot (20) by the extension of the inlet (31) through the duct (24) and into the first pot (10).

Figure 3:
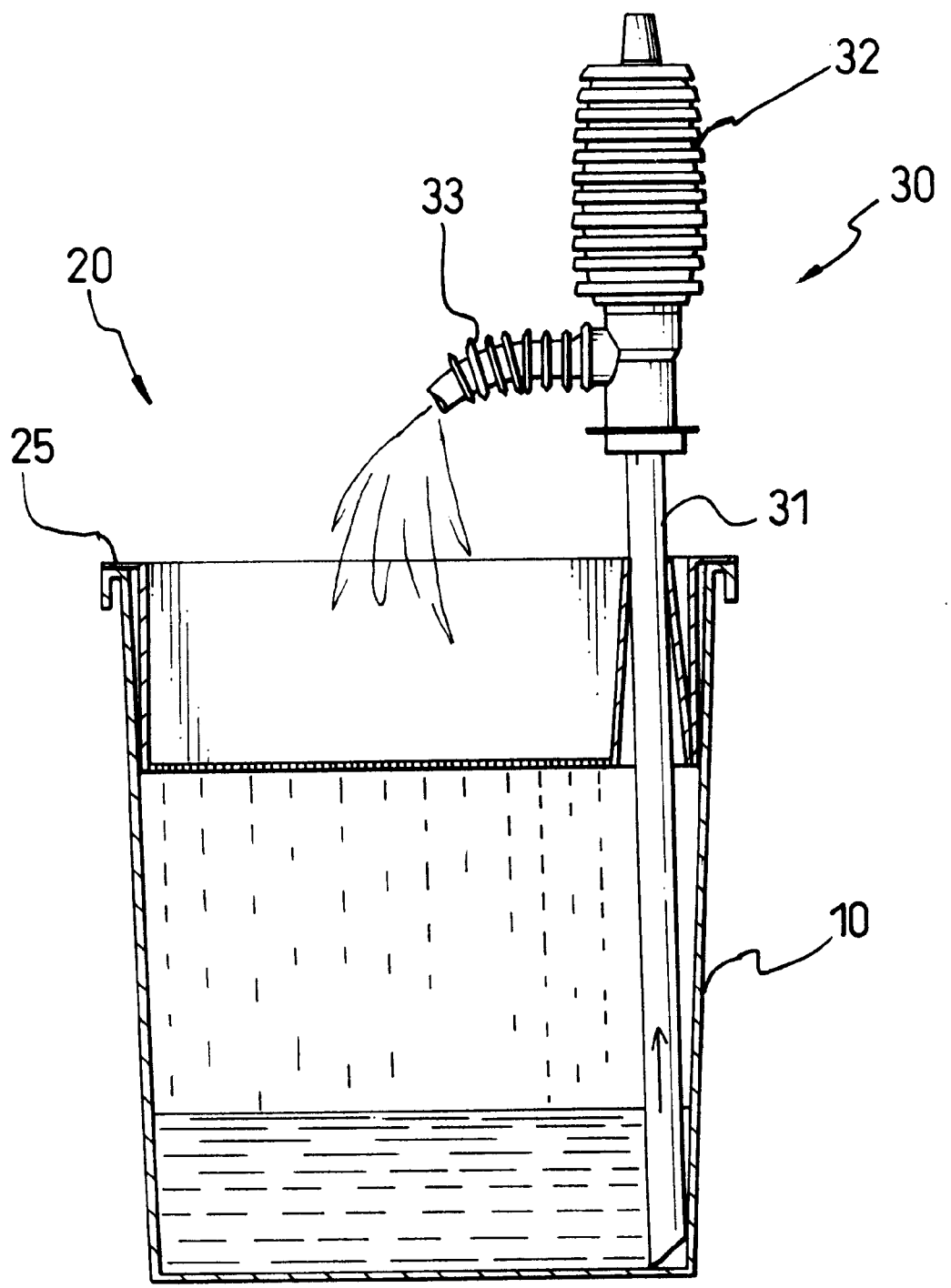
FIG. 3 is a side view in partial cross section showing the internal arrangement of the flowerpot in accordance with the present invention.

As shown in FIG. 3, water in the first pot (10) is able to be sucked upward by the pump (30) to water the plant in the second pot (20), and the excess water then seeps back into the first pot (10) via the screen (23) for recycling.

Figure 4:
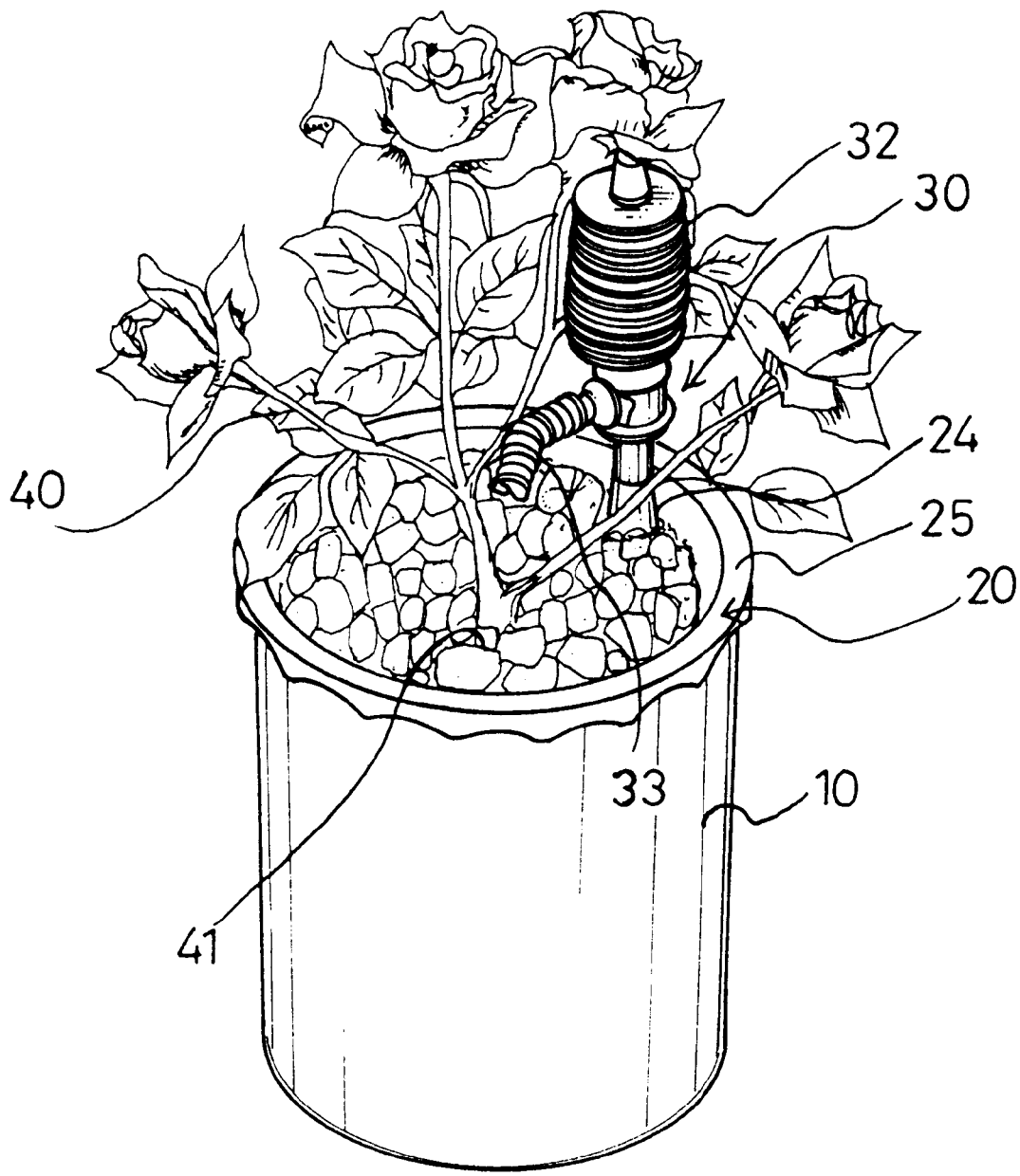
FIG. 4 is a perspective view showing the application of the flowerpot in accordance with the present invention.

FIG. 4 shows that when the plant (40) and the soil (41) are placed in the second pot (20), pumping the pump (30) will transport the water in the first pot (10) to water the plant (40) via the outlet (33). Therefore, excess water then seeps back into the first pot (10) to be used again.

The present invention has the following advantages:

Because the water in the first pot (10) is isolated from the environment by the second pot (20), insects will not have access to the water, such that insects depending mainly on water to breed will thus lose their habitat, and a potential danger to people is eradicated.

Water in the first pot (10) is recycled and the water vapor continues to provide moisture to the soil and the roots of the plant.

What is claimed is:

1. A flowerpot comprising:

a first pot for containing water therein;

a second pot detachably located on top of the first pot and having a screen provided on the bottom thereof to allow excess water to flow into the first pot for storage, a duct provided on the screen, and a flange formed on the upper rim thereof to support the second pot on top of the first pot; and a pump having an inlet directed by the duct to extend into the first pot, a bellows communicating with the inlet and an outlet communicating with the inlet for transferring the water in the first pot to the second pot.

* * * * *